Patented Aug. 21, 1951

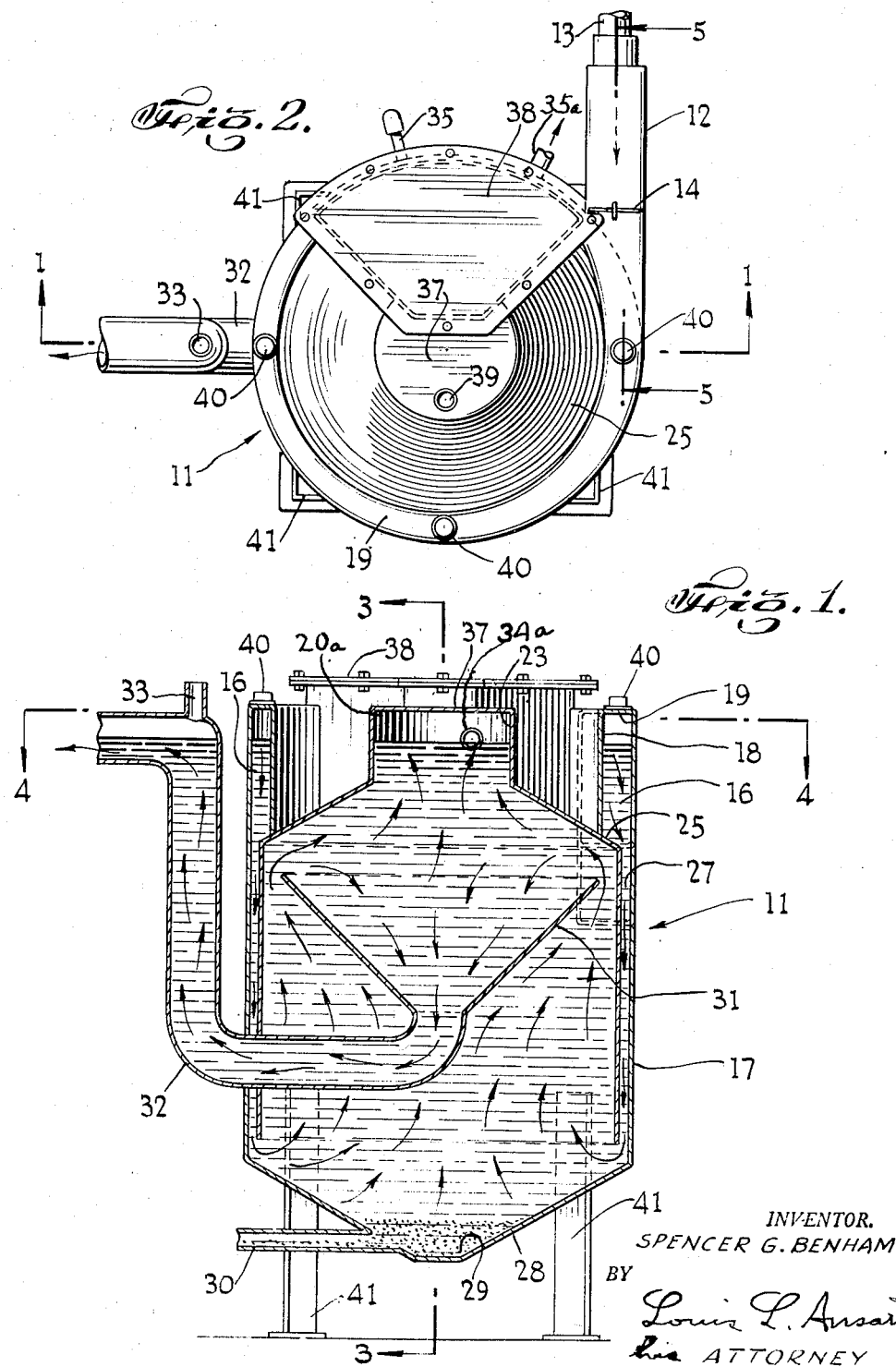

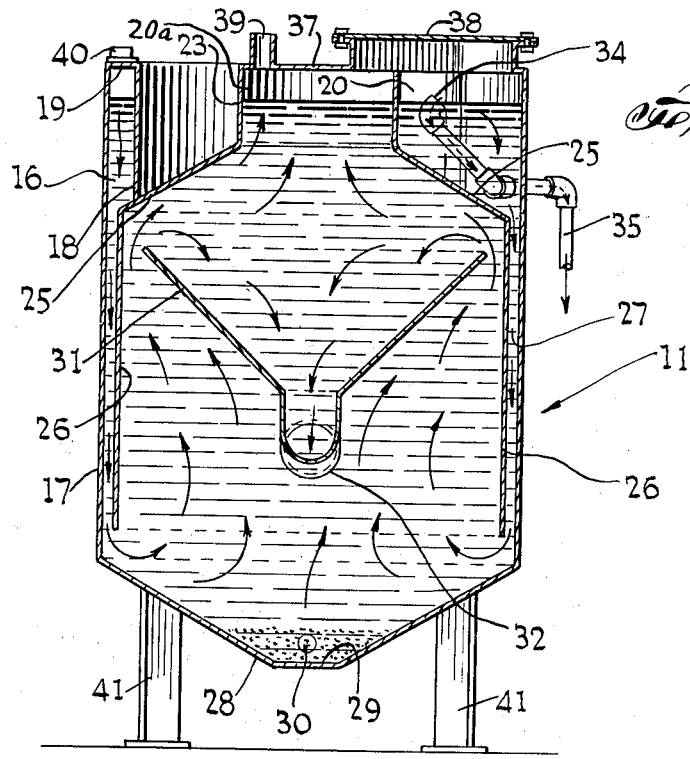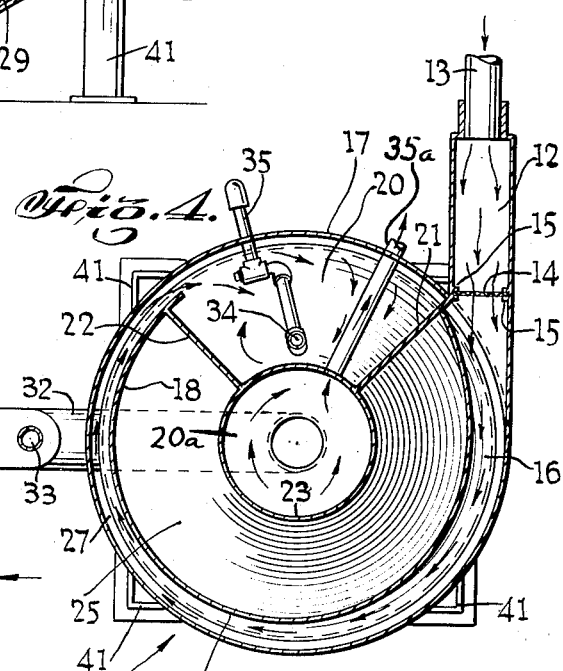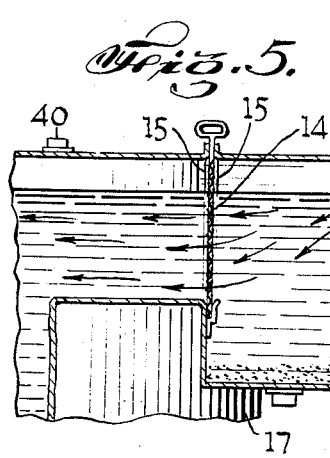

2,565,343

UNITED STATES PATENT OFFICE 2,565,343

LIQUID SEPARATION

Spencer G. Benham, Brooklyn, N. Y.; Lessie Lee Benham executrix of said Spencer G. Benham, deceased Application May 15, 1948, Serial No. 27,348

16 Claims. (Cl. 210—61)

The invention relates generally to the separation of liquids having different specific gravities or of floatable solids from a liquid in which they may be carried. More particularly, it relates to the separation and recovery of oil or oily substance from water such as in the cleaning of the effluents from manufacturing plants to prevent stream pollution, and to the cleaning of liquids used in manufacturing plants by removing the foreign liquids and solids so as to permit reuse of the cleaned liquids.

The objects of this invention includes the design of novel and advantageous means for separating liquids of different specific gravities, arranged for operating continuously; for operating with a wide range of capacities; and for keeping the free floating oils and floatable solids floating on the surface of the liquid until they are discharged from the separating means or separator and submerging only the oils and solids that are entrained in the mixtures of the materials to be separated.

The invention as carried out in a preferred form of apparatus, involves the flowing of the mixture to be separated into an inlet chamber. The heavy sludge and dirt are settled out in the inlet chamber and the liquid flows therefrom through a screen to remove the larger particles of floating foreign matter. The liquid then flows into a distributing channel formed between a preferably cylindrical shell of the separator and a plate extending part way around the inner surface of said shell. The distributing channel gradually decreases in width and is graduated to maintain the necessary velocity of flow to carry the free floating oils and floating solids into an oil draw-off chamber. The heavier liquids flow downwardly from the distributing channel into a vertical channel formed between the outside shell of the separator and a cylindrical guide plate at a very slow velocity. From the vertical curved channel which extends completely around the shell, the liquid flows into a quiescent body of liquid in the lower portion of the separator where the heavier particles will settle and be discharged from the separator through a clean out pipe.

A conical shaped outlet basin is located inside the separator coaxial with the cylindrical shell. The liquid flows upwardly from the quiescent body of liquid into the channel formed between the conical shaped outlet basin and the cylindrical guide plate. Due to the tapered shape of the channel formed between the conical shaped outlet basin and the cylindrical guide plate the velocity of the upward flow is extremely slow as it starts to move upwardly from the quiescent body of liquid but increasess uniformly as it approaches the top edge of the conical shaped outlet basin where the flow enters a quiescent body of liquid in the upper portion of the separator above the top of the outlet basin.

Due to the velocity of the liquid entering the quiescent body of liquid through the throat formed between the top edge of the conical shaped outlet basin and the cylindrical guide plate coupled with the urge that oils and lighter substances have to rise to the surface when submerged in a heavier liquid, the oils and floatable solids will continue their upward travel to the uppermost surface of the liquid in the separator. Over the quiescent body of liquid above the conical shaped outlet basin is a cover conical in shape and connected through a central opening thereon with a second oil draw-off chamber. The sloping surface of the conical shaped cover accelerates the urge of the oils and floatable solids to enter the said second oil draw-off chamber and rise to the surface of the liquid therein.

By discharging the cleaned liquid from the separator through such a conical shaped outlet basin, the velocity of the flow from the quiescent body of liquid above into the large mouth of the conical shaped outlet basin is extremely slow and uniform. This extremely slow and uniform downward movement of the cleaned liquid from the quiescent body of liquid into the outlet basin has no drawing down action on the oils and floatable solids floating upwardly in such quiescent body of liquid. The oils and floatable solids will continue their upward travel into the corresponding oil draw-off chamber.

The cleaned liquid flows downwardly through the conical shaped outlet basin, the velocity increasing uniformly to the bottom thereof where the cleaned liquid enters an outlet pipe through which it is discharged from the separator. The oils and floatable solids are discharged from the separator through oil draw-off devices associated with the oil draw-off chambers.

While the foregoing objects and features are paramount, the invention has particular reference to salient features of construction and arrangement of parts. In the accompanying drawing there has been illustrated the best embodiment of my invention known to me, but such embodiment is to be regarded as typical only of many possible embodiments of my invention which is not limited thereto.

Fig. 1 is a vertical section of an approved embodiment of my invention, taken along line 1—1 of Fig. 2;

Fig. 2 is a top plan view of the apparatus shown in Fig. 1;

Fig. 3 is a vertical section taken along the line 3—3 of Fig. 1;

Fig. 4 is a section taken along the line 4—4 of Fig. 1; and

Fig. 5 is a section taken along the line 5—5 of Fig. 2.

In the drawings which illustrate one embodiment of the invention, 11 indicates a separator, preferably cylindrical in shape; 12 indicates an inlet or grit chamber, preferably rectangular in shape, supplying liquid to said separator; 13 indicates an inlet pipe supplying liquid to said inlet chamber 12; and 14 indicates a removable screen through which liquid flows from the inlet chamber to the separator (Figs. 4 and 5). Heavy particles are readily settled in a sump of the inlet chamber 12, while floatable objects and material not easily removed by settling are held back by the screen 14. Preferably, the removable screen 13 is slidable in suitable guides 15 as indicated in Figs. 4 and 5.

A distributing channel 16 is formed between a cylindrical shell 17 of the separator and a vertical guide plate 18, curved and positioned so that the width of said channel 16 decreases from the inlet chamber 12 to its other end, part way around the periphery of the shell 17. Said channel 16 has a top 19 secured to the upper edge of the shell 17 and also to the upper edge of said guide plate 18 thus supporting the latter.

Between the ends of the distributing channel 16, is an oil draw-off chamber 20 included between the corresponding portion of the shell, two radial walls 21 and 22, respectively, at the entrance and discharge ends of said circulating channel, and a part of a cylindrical shell 23 coaxial with said shell 17 to which the inner edges of said radial walls are connected. Said wall 22 is connected at its outer edge to the guide plate 18, and said wall 21 is connected at its outer edge not only to the guide plate 18 at the entrance end of the circulating channel but also to the shell 17.

Beneath said circulating channel 16 and said oil draw-off chamber 20 is a frusto-conical top 25 of a cylinder or cylindrical shell 26 which is open at its bottom. Said top 25 has a central opening and shell 26 is coaxial with the shell 17, being sufficiently smaller in diameter to leave a cylindrical vertical channel or passage 27 of uniform thickness. Said cover or top 25 of the cylinder or shell 26 also serves as the bottom of the distributing channel 16 and the oil draw-off chamber 20, leaving them in communication with said channel 27 extending all around the shell 17. The lower edge of said cylindrical shell 23 is connected to the edge of the central opening in top 25, and the bottom of said cylindrical shell 25 reaches almost to the bottom 28 of the outer shell 17. Liquid from the distributing channel 16 passes downwardly through the cylindrical passage 27 into the quiescent liquid in the lower part of shell 17 and solids carried thereinto by the downflowing liquid, settle on said bottom 28 which slopes downwardly toward a central sump 29. Settled solids and sludge in said sump may be withdrawn through a discharge pipe or duct 30 to any desired point.

An outlet basin 31 is located principally in the upper part of the space enclosed by the cylindrical shell or wall 26. This outlet basin is of a generally conical shape with a large upper end arranged to receive water and heavier liquids flowing upwardly through the relatively narrow space or throat between its upper edge and the inner surface of said wall 26. Liquid in said basin 31 may be drawn off through a duct or pipe 32 extending upwardly and then laterally at such a level as to leave a space above the liquid for any gases separating from the liquid. A vent 33 is provided for this part of the duct.

Oils and lighter liquids flowing into the space above the outlet basin pass upwardly through the central opening in the cover of top 25 and into an oil draw-off chamber 20a. Such oils and lighter liquids are skimmed from the surface of the liquid in oil draw-off chambers 20 and 20a through oil draw-offs 34 and 34a respectively, and disposed of through ducts or pipes 35 and 35a. The tops of the oil chambers 20 and 20a are closed by a cover 37 provided with a manway and a cover 38 therefor as well as a vent 39 for gases collecting in the draw-off chambers. The cover 19 of the distributing channel 16 may be provided with clean out ports 40.

The separator 11 may be mounted upon suitable supports 41.

The separator 11 of this invention is designed to separate from water or heavier liquids, oils or lighter liquids which may be mixed therewith. That is, the effluent flowing from my separator will be relatively clean or free of oils and lighter liquids. The lighter substances such as oil, oily materials and grease, which are separated from the liquid passing through the separator are discharged from the separator through the adjustable or automatic oil draw-off services 34 and 34a and pipe 35 and 35a.

If the liquids to be separated are emulsified a de-emulsifying agent or chemical must be added to the liquid before it enters the separator.

The mixture to be treated by this separator is flowed thereinto through inlet chamber 12 where the non-floatable solids and heavy sludge are settled and the liquid flows through screen 14 to remove any large particles of floatable foreign matter. The liquid flows from inlet chamber 12 into distributing channel 16. This channel is narrow and deep and the buoyancy of the free floating oils and floatable solids keep them floating on the surface in the distributing channel so as to pass into the oil draw-off chamber 20 at the end of distributing channel 16.

Distributing channel 16 is graduated in width from the inlet end to the outlet end thereof as shown on drawing Fig. 1, to maintain an even velocity of the flow in the distributing channel from the inlet to the outlet thereof. By maintaining an even velocity of the flow, the oils and floatable solids are carried on the surface in the distributing channel into the oil draw-off chamber 20 at the discharge end of the channel 16. The heavier liquids flow downwardly from the distributing channel through the vertical cylindrical channel 27. The oils and floatable solids entrained in the liquid being the only parts of the waste to flow downwardly with the liquid through channel 27. The downward flow in channel 27 is very slow and the liquid therein enters the quiescent body of liquid near the bottom 28 of the separator very quietly, thus eliminating the creation thereby of disturbances and eddies in the quiescent body of liquid in the lower portion of the separator where the non-floatable solids settle into the bottom of the separator.

The liquid enters the quiescent body of liquid in the bottom portion of the separator at a substantial submergence below the liquid level in the separator thus creating separating impulses upon the substances in the liquid. The liquid flows upwardly through the channel between cylindrical plate 26 and outlet basin 31 from the quiescent body of liquid in the lower portion of the separator. Due to the large cross-sectional area of this channel at the level where the liquid rises from the quiescent body of liquid into this channel basin, the upward movement is slow and also due to the upwardly decreasing cross-section of the channel the velocity increases uniformly to the top edge of outlet basin 31 where the liquid enters the quiescent body of liquid in the upper portion of the separator through a circular throat formed between cylindrical plate 26 and the top edge of outlet basin 31.

As a result of the increase in velocity in the upward flow of the liquid as it approaches the throat at the top edge of the outlet basin 31, coupled with the urge of lighter substances to rise to the surface when submerged in a heavier liquid, the velocity of the rising oils and floatable solids will be to carry them to the upper surface of the liquid in the separator. The sloping surface of the conical shaped cover 25 accelerates the flow of the oils and floatable solids into the oil draw-off chamber 20a where they are skimmed from the surface of the liquid through the oil draw-off 34a and discharged from the separator through oil draw-off pipe 35a.

The clean liquid or effluent flows downwardly into outlet basin 31 and is discharged from the separator through outlet or effluent pipe 32. The difference in level of the influent liquid and effluent liquid is so small as to assure a low velocity of flow through the apparatus.

Due to the large horizontal area of the entrance into outlet basin 31 the downwardly movement of the liquid from the higher-level quiescent body of liquid into outlet basin 31 is very slow thereby eliminating any downward pull on the oils and floatable solids traveling upwardly in the liquid above said outlet basin.

It will be evident that the influent liquid passes through several cleaning stages before it emerges from the separator as relatively clean effluent. In passing through the inlet or grit chamber 12, heavier particles are removed by settling. The liquid then moves through the screen 14 which removes relatively large floatable pieces of material. In passing through the distributing channel 16 to the oil draw-off chamber, there is separation of lighter oil, grease and the like from the heavier liquid which carries down through the cylindrical passage 27 some of the solids and some oil and oily material. In the quiescent liquid at the bottom of the separator, there is additional removal of solids by settling. Finally in the upward flow of liquid to the quiescent zone above the outlet basin 31, additional oil and oily material is separated from the rest of the liquid and passed into the oil draw-off chamber 20a.

Obviously the apparatus of the present invention effects thorough removal of oily and other material from the liquid supplied for treatment.

It should be understood that various changes can be made and that certain features can be used without others, without departing from the true spirit and scope of the invention.

What is claimed is:

1. A separator comprising a tank, having a peripheral wall, a deep arcuate distributing channel extending along the upper part of said peripheral wall and wherein material comprising free floating oils, greases and floatable solids collect at the surface of liquid flowing through the channel, said distributing channel having an inlet end to receive the liquid to be purified and an outlet end, means for separating said material collected at the surface from the rest of the liquid in said channel including an oil draw-off chamber at the outlet end of said channel, means for draining liquid from the lower parts of said channel and draw-off chamber and delivering it to a lower part of the separator, means for effecting further clarification of the liquid delivered to said lower part of the separator, and means for discharging the clarified liquid from the separator in a smooth flow.

2. The combination according to claim 1 wherein the cross-section of the distributing channel decreases progressively toward its outlet end to provide uniform velocity throughout the length of the channel.

3. The combination according to claim 1 wherein the distributing channel is of uniform depth and its width diminishes from its inlet end to its outlet end in inverse proportion to the increase in volume of liquid withdrawn from the lower part of the channel whereby the liquid velocity will be uniform throughout the length of the channel.

4. The combination according to claim 1 wherein the liquid draining means comprises a narrow outlet in the bottom of said channel and said oil-draw-off chamber.

5. The combination according to claim 1 wherein said lower part of the separator comprises a chamber of relatively large horizontal cross section and the liquid draining and delivering means delivers liquid to said chamber uniformly around the periphery thereof and at its bottom so as not to disturb the quiescent liquid in said chamber and interfere with the settling of solids on the bottom of said chamber, means at the top of said chamber for separating additional oily matter from the liquid, and means for withdrawing clarified liquid from the upper part of said chamber.

6. An oil and water separator comprising a cylindrical outer shell with a bottom, a distributing channel in the upper part of said shell and at the inner face thereof, said channel having an inlet end to receive liquid to be clarified and an outlet end, a curved guide plate forming the inner side of said channel and gradually approaching said shell toward said outlet end to maintain the velocity in said channel as the liquid is distributed, an oil removal chamber at the outlet end of said channel and extending to the inlet end thereof, a bottom for said channel and chamber sloping downwardly toward said outer shell but leaving an arcuate outlet, an inner cylindrical shell forming with said outer shell a cylindrical passage leading to the lower part of said outer shell to avoid disturbance of liquid therein, means for separating oil and grease from liquid passing upwardly in said inner shell and discharging it into a second oil-removal chamber, and means for discharging the cleaned liquid from said second oil removal chamber and the separator.

7. The combination according to claim 6 wherein said inner cylindrical shell has a top with a frusto-conical outer part providing bottoms for the distributing channel and the first mentioned oil withdrawal chamber and a central upwardly projecting cylindrical portion constituting said second oil-withdrawal chamber.

8. The combination according to claim 6 wherein said means for discharging the clean liquid from the separator comprises an outlet basin in the form of an inverted conical shell with its open upper end spaced from said inner shell to provide an annular throat and its smaller end down and an outlet pipe connected to said outlet basin at its bottom.

9. The combination according to claim 6 wherein said means for discharging the cleaned liquid comprises within said inner shell an outlet basin having at its top a round mouth separated from said inner shell by an annular throat and at its bottom a much smaller cross-section, and also comprises an outlet pipe connected to the lower end of said outlet basin.

10. A separator comprising means for introducing liquid into the separator, a cylindrical outer shell with a bottom, a cover above said bottom of said outer shell and separated from said outer shell by an annular opening, said cover having a central opening and around said opening a frusto-conical, downwardly-concave lower surface, means above said cover to separate material including lighter oils, greases and floatable solids from the heavier liquid, with entrained oil and solids means for directing the heavier liquid to said annular opening, a cylindrical inner shell with its upper edge sealed to the edge of said cover and with its lower edge spaced above said bottom providing a cylindrical passage for downward flow of liquid, means for separating oily material from the upwardly flowing liquid in said inner shell and passing it through said central opening, and means for withdrawing the cleaned liquid from the upper part of said inner shell.

11. The combination according to claim 10 wherein said means for withdrawing said cleaned liquid from said inner shell comprises an outlet basin with an open top spaced from said inner shell to provide an annular throat for the upwardly flowing liquid and said outlet basin decreasing progressively in horizontal cross-section to its bottom, and outlet means including a pipe connected to the bottom of said outlet basin.

12. A liquid separator adapted for continuous operation and acting on the gravity principle, comprising an external cylindrical shell, a bottom for said shell, an inner cylindrical shell spaced from said external shell and from said bottom to provide a downward flow passage of annular cross section less than the area of a cross-section of said inner cylindrical shell, a top for said inner shell including a downwardly concave frusto-conical outer part and a central vertical oil removal chamber sealed to the upper edge of said frusto-conical part, means for removing floatable oil from said central vertical chamber as it rises above a predetermined level, an upwardly concave conical shell beneath said top for the inner shell leaving an annular opening for upward passage of liquid and serving to receive the cleaned liquid, a duct leading from the reduced lower end of said upwardly concave shell and discharging the cleaned liquid outside said separator at a height to produce a smooth flow, and means above the top of said inner shell to receive liquid to be cleaned, to remove floatable solids and liquids of lesser specific gravity, and to supply the rest of the liquid to the top of the passage between the outer end inner shells.

13. The combination according to claim 12 wherein said means above the top of said inner shell comprises a channel receiving at its inlet end liquid flowing tangentially of the outside of the outer shell and extending along the inner surface of the outer shell, with its bottom open over the top of said downward flow passage between said cylindrical shells, said channel having an outlet end, an oil and waste receiving chamber connected to the outlet end of said channel and extending to the inlet end of said channel and means for removing floatable solids and liquids from said oil and waste receiving chamber.

14. The combination according to claim 13 wherein said channel gradually decreases in cross-section from its inlet to its outlet and to maintain uniform velocity.

15. A liquid separator through which a stream of liquid passes under control of a differential head, comprising a main cylindrical shell, a central cylindrical open bottom oil removal chamber at the top of said main shell, a downwardly concave conical member having a central opening in which the lower edge of said oil removal chamber is secured and a lower edge spaced from said main shell to provide an annular opening at the inner surface of said main shell, a wall spaced inwardly from said outer shell to provide a channel of gradually decreasing width and with said downwardly concave member as a sloping bottom having said annular opening at its outer edge, a chamber on said downwardly concave member receiving liquid flowing from the smaller end of said channel and extending around to a position adjacent the receiving end of said channel but separated therefrom, whereby liquid containing entrained oily liquid and heavier solids pass downwardly through said annular opening, means below said downwardly concave member for settling solids carried downwardly with the liquid flow and for separating entrained oily liquid from the heavier liquid in an upward flow and supplying it to said open bottom oil removal chamber and for passing the cleansed liquid from the apparatus while maintaining a low differential head, means for withdrawing waste oily liquid from said open-bottom oil-removal chamber and means for removing oily liquid from said chamber receiving oily liquid from said channel.

16. The combination according to claim 15 wherein the flow of liquid through the separator is controlled by the differential head of the liquid at the inlet and outlet.

SPENCER G. BENHAM.

REFERENCES CITED

The following references are of record in the file of this patent:

UNITED STATES PATENTS

| Number | Name | Date |
|---|---|---|
| 700,826 | Roan | May 27, 1902 |
| 812,831 | Davidson | Feb. 20, 1906 |
| 952,620 | Keyes | Mar. 22, 1910 |
| 1,116,903 | McClintock | Nov. 10, 1914 |
| 1,147,381 | Morris | July 27, 1915 |
| 1,636,866 | Kutzer | July 26, 1927 |
| 1,761,505 | White | June 3, 1930 |
| 1,864,511 | Jones | June 21, 1932 |
| 1,921,689 | Meurk | Aug. 8, 1933 |
| 2,301,371 | Corwin | Nov. 10, 1942 |
| 2,326,384 | Mount | Aug. 10, 1943 |

FOREIGN PATENTS

| Number | Country | Date |
|---|---|---|
| 10,867 | Great Britain | May 11, 1904 |
| 344,604 | Great Britain | Mar. 12, 1931 |

Certificate of Correction

Patent No. 2,565,343 August 21, 1951

SPENCER G. BENHAM

It is hereby certified that error appears in the printed specification of the above numbered patent requiring correction as follows:

Column 7, lines 18 and 19, strike out "means for directing the heavier liquid" and insert the same before "with," in line 17, same column; and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*